(12) United States Patent
Reimers et al.

(10) Patent No.: US 12,422,914 B2
(45) Date of Patent: *Sep. 23, 2025

(54) DYNAMIC POWER MANAGEMENT AMONG MULTIPLE MEMORY DEVICES

(71) Applicant: SK Hynix NAND Product Solutions Corp., Rancho Cordova, CA (US)

(72) Inventors: Niels Reimers, Meadow Vista, CA (US); Andrew Morning-Smith, Vancouver (CA)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 18/375,362

(22) Filed: Sep. 29, 2023

(65) Prior Publication Data

US 2025/0110542 A1    Apr. 3, 2025

(51) Int. Cl.
```
G06F 1/26      (2006.01)
G06F 1/32      (2019.01)
G06F 1/3234    (2019.01)
G06F 1/3296    (2019.01)
```

(52) U.S. Cl.
CPC .......... *G06F 1/3275* (2013.01); *G06F 1/3296* (2013.01)

(58) Field of Classification Search
CPC .............................. G06F 1/3296; G06F 1/3275
See application file for complete search history.

(56) References Cited

U.S. PATENT DOCUMENTS

| | | |
|---|---|---|
| 2019/0235774 A1 | 8/2019 | Benisty et al. |
| 2019/0286350 A1* | 9/2019 | Yoo ..................... G06F 11/3062 |
| 2020/0104062 A1* | 4/2020 | Cho ....................... G06F 3/0619 |
| 2020/0280258 A1* | 9/2020 | Yamazaki ............. H02M 5/458 |
| 2021/0064111 A1 | 3/2021 | Kaburlasos et al. |
| 2021/0278999 A1* | 9/2021 | Chun .................... G06F 3/0659 |
| 2021/0373518 A1 | 12/2021 | Spalt et al. |
| 2021/0373638 A1 | 12/2021 | Schluessler et al. |

(Continued)

FOREIGN PATENT DOCUMENTS

KR    20170033227 A    3/2017

OTHER PUBLICATIONS

SK Hynix NAND Product Solutions Corp. (dba Solidigm), PCT/US2024/048606 International Search Report and Written Opinion Dec. 26, 2024, 10 pgs.

*Primary Examiner* — Mohammed H Rehman
(74) *Attorney, Agent, or Firm* — Morgan, Lewis & Bockius LLP

(57) ABSTRACT

This application is directed to dynamic power management among multiple memory devices of an electronic system. A plurality of memory devices are coupled into a ring of memory devices, and passes a power data packet along a power control path that tracks the ring of memory devices continuously. During a current cycle, a first memory device receives the power data packet from an upstream memory device on the power control path, and the power data packet includes at least a system power level indicating total power consumption of the plurality of memory devices. The first memory device sets a current power level of the first memory device based on the received power data packet, updates the power data packet based on the current power level, and sends the updated power data packet to a downstream memory device on the power control path.

20 Claims, 7 Drawing Sheets

(56) References Cited

U.S. PATENT DOCUMENTS

2023/0005550 A1* 1/2023 Park .................. G06F 3/061
2023/0086648 A1* 3/2023 Yan .................... H02J 1/14
　　　　　　　　　　　　　　　　　　　　320/109

* cited by examiner

DYNAMIC POWER MANAGEMENT AMONG MULTIPLE MEMORY DEVICES

TECHNICAL FIELD

This application relates generally to memory management including, but not limited to, methods, systems, and non-transitory computer-readable media for managing power of memory devices in a memory system.

BACKGROUND

Memory is applied in a computer system to store instructions and data. Particularly, the computer system relies on non-volatile memory to keep instructions and data stored thereon if the computer system is decoupled from a power source. Examples of the secondary memory include, but are not limited to, hard disk drives (HDDs) and solid-state drives (SSDs). Different SSDs can be configured to implement different memory functions under the control of its host device. Many electronic systems (e.g., servers, Just a Bunch of Disks (JBOD), racks, appliances) include a large number (e.g., 4-30) of SSDs. Each of these SSDs varies in power utilization from idle around 5 W to full power/performance around 25 W today, and in some situations, up to 40 W to meet the needs of Peripheral Component Interconnect Express (PCIe) 6.0 standard. For example, an electronic system uses 10 SSDs and can have a power swing from 50 W to 250 W or up to 400 W. This wide power swing of 50-400 W requires compatible power supply and thermal management designs in the electronic system. This problem only gets worse when the electronic system includes more SSDs and is used as a data center rack and a total data center. Some solutions are focused on overdesigning the electronic system to accommodate the worst case when all SSDs operate at their maximum power levels, which creates an initial cost and recurring cost of these design decisions while this worst case rarely occurs in normal operation. Alternatively, some solutions set a moderate limit for a total power of the SSD of the electronic system at the price of limiting power for each individual SSD. The electronic system oftentimes operates at a compromised power efficiency and does not allow for maximum performance on any SSD. It would be beneficial to develop a mechanism for managing power of memory devices of an electronic system to operate in an efficient manner.

SUMMARY

Various embodiments of this application are directed to methods, systems, devices, and non-transitory computer-readable media for dynamically managing power of a plurality of memory devices that are coupled to a host device in an electronic system (e.g. a computer system). The electronic system sets a predefined power budget (also called a preferred power budget) for a total power of the plurality of memory devices, while still allowing each individual memory device to operate in a full power range. Total power consumption of the plurality of memory devices is controlled based on the predefined power budget of the plurality of memory devices, and is allocated among individual memory devices within their power ranges. Specifically, a power data packet is communicated among the individual memory devices using peer-to-peer communication. The power data packet includes at least a system power level indicating total power consumption of the plurality of memory devices. The plurality of memory devices are arranged by a host device into an ordered ring of memory devices. As the power data packet is passed to each individual memory device on the ring, the respective memory device adjusts (e.g., increases, decreases) its own power level based on the system power level. For example, each memory device is configured to increase its power level in accordance with a determination that the system power level is lower than the predefined power budget. By these means, the system power level of the plurality of memory device is kept on or below the predefined power budget, and a power level of each individual memory device is dynamically adjusted in its power range based on whether the system power level reaches the predefined power budget.

In one aspect, a method is implemented to dynamically manage power of a plurality of memory devices coupled to a host device in an electronic system. The plurality of memory devices are coupled into a ring of memory devices. The method includes passing a power data packet along a power control path that tracks the ring of memory devices continuously. Passing the power data packet along the power control path further includes, at a first memory device and during a current cycle, receiving the power data packet from an upstream memory device on the power control path, setting a current power level of the first memory device based on the received power data packet, updating the power data packet based on the current power level, and sending the updated power data packet to a downstream memory device on the power control path. The power data packet includes at least a system power level indicating total power consumption of the plurality of memory devices.

In some embodiments, the power data packet further includes one or more of: a predefined power budget defining an upper limit of a total power of the plurality of memory devices, a first power level of the first memory device during a most recent cycle that precedes the current cycle, and a target power level of the first memory device during the current cycle.

In some embodiments, the method further includes determining a first power level of the first memory device during a most recent cycle that precedes the current cycle, identifying a target power level associated with the current cycle of the first memory device, and comparing the first power level and the target power level of the first memory device. Further, in some embodiments, in accordance with a determination that the first power level is greater than the target power level, the current power level of the first memory device is set to the target power level. Passing the power data packet further includes replacing the first power level of the first memory device with the current power level. Updating the power data packet further includes decreasing the system power level of the power data packet by a power variation between the first power level and the target power level of the first memory device.

Some implementations of this application include an electronic system that includes one or more processors and memory having instructions stored thereon, which when executed by the one or more processors cause the processors to perform any of the above methods on a memory system (e.g., including a plurality of SSDs).

Some implementations of this application include a memory system that includes a plurality of memory devices (e.g., including a plurality of SSDs) and memory having instructions stored thereon, which when executed by the one or more processors cause the processors to perform any of the above methods on the memory system.

Some implementations include a non-transitory computer readable storage medium storing one or more programs. The one or more programs include instructions, which when executed by one or more processors cause the processors to implement any of the above methods on a memory system (e.g., including a plurality of SSDs).

In some embodiments, the power data packet is communicated among the plurality of memory devices to leverage a system characteristic where workloads across different memory devices are not evenly distributed when measured in seconds or minutes. A power level of a memory device varies when the memory device operates in an idle mode, a read mode, or a write mode. For example, the power level of each memory device can swing between a first power of the idle mode (e.g., 5 W) and a second power of the write mode (e.g., 25 W), while the power level rarely hits the second power. It almost never happens that all of the plurality of memory devices operate at the second power concurrently. As such, each individual memory device is allowed to use the second power, while the system power level of the plurality of memory device is controlled on or below the predefined power budget. The predefined power budget is less than a product of the second power and a total number of memory devices. This enables a cost effective electronic system configured for normal operations and efficient power consumption.

In an example, a first electronic system has 10 SSDs, and each SSD has an upper limit of 25 W for power consumption. An upper limit for total power consumption of the first electronic system is 250 W. The electronic system is configured to provide and manage a power of 250 W for the 10 SSDs. A second electronic system has 10 SSDs, and each SSD has an upper limit of 12.5 W for power consumption. An upper limit for total power consumption of the second electronic system is 125 W. Performance of each SSD is limited by the upper limit of each SSD's power consumption. Despite cost efficiency, the second electronic system compromises performance of each of the 10 SSDs compared with the first electronic system. In contrast, in some embodiments of this application, a third electronic system has 10 SSDs, and each SSD has an upper limit of 25 W for power consumption. Given that each SSD rarely consumes 25 W and that it almost never happens with all of the SSDs consuming 25 W at the same time, an upper limit for total power consumption of the third electronic system (i.e., a predefined power budget) is set at 125 W, and power consumption of each SSD is dynamically controlled to consume up to 25 W, while the total power consumption of the 10 SSDs is controlled below 125 W. The third electronic system enables analogous data storage performance to that of the first electronic system, while keeping a total power consumption at a reduced system power level and reducing requirements for power management.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic systems or devices with data storage capabilities.

This application is directed to dynamically managing power of a plurality of memory devices that are coupled to a host device in an electronic system (e.g. a computer system). The electronic system sets a predefined power budget for a total power of the plurality of memory devices, while still allowing each individual memory device to operate in a full power range. Total power consumption of the plurality of memory devices is controlled based on the predefined power budget of the plurality of memory devices, and is allocated among individual memory devices within their power ranges. Specifically, a power data packet is communicated among the individual memory devices using peer-to-peer communication. The power data packet includes at least a system power level indicating total power consumption of the plurality of memory devices. The plurality of memory devices are arranged by a host device into an ordered ring of memory devices. As the power data packet is passed to each individual memory device on the ring, the respective memory device adjusts (e.g., increases, decreases) its own power level based on the system power level. For example, each memory device is configured to increase its power level in accordance with a determination that the system power level is lower than the predefined power budget. By these means, the system power level of the plurality of memory device is kept on or below the predefined power budget, and a power level of each individual memory device is dynamically adjusted in its full power range based on whether the system power level reaches the predefined power budget.

Figure 1:
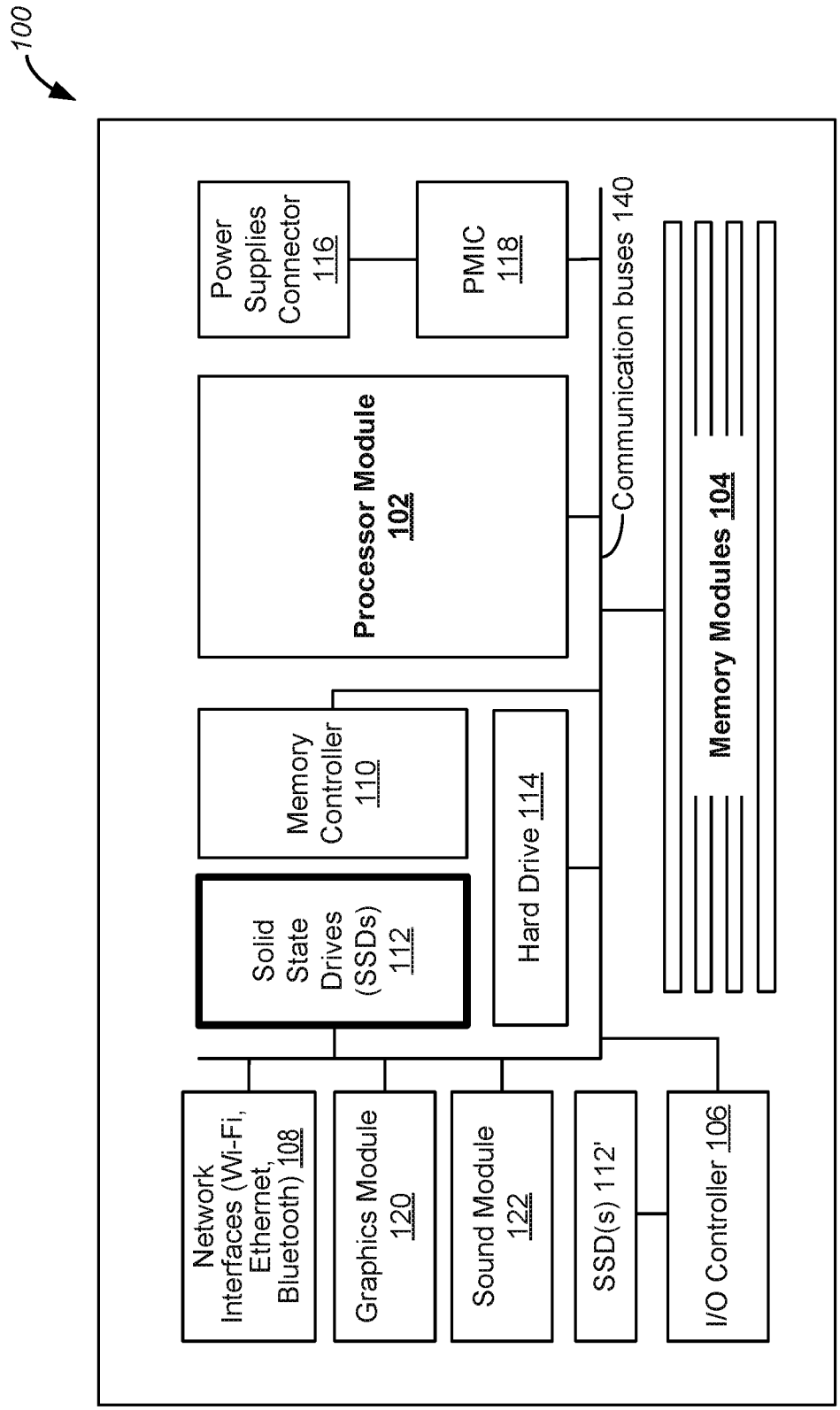
FIG. 1 is a block diagram of an example system module in a typical electronic system in accordance with some embodiments.

FIG. 1 is a block diagram of an example system module 100 in a typical electronic system in accordance with some embodiments. The system module 100 in this electronic system includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a track-pad) via a universal serial bus interface. In some embodiments, the network interfaces 108 includes one or more interfaces for Wi-Fi, Ethernet and Bluetooth networks, each allowing the electronic system to exchange data with an external source, e.g., a server or another electronic system. In some embodiments, the communication buses 140 include circuitry (sometimes called a chipset) that interconnects and controls communications among various system components included in system module 100.

In some embodiments, the memory modules 104 include high-speed random-access memory, such as DRAM, static random-access memory (SRAM), double data rate (DDR) dynamic random-access memory (RAM), or other random-access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, SSDs 112, a hard disk drive (HDD) 114, power management integrated circuit (PMIC) 118, a graphics module 120, and a sound module 122. The memory controller 110 is configured to control communication between the processor module 102 and memory components, including the memory modules 104, in the electronic system. The SSDs 112 are configured to apply integrated circuit assemblies to store data in the electronic system, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic system. In some embodiments, the graphics module 120 is configured to generate a feed of output images to one or more display devices according to their desirable image/video formats. In some embodiments, the sound module 122 is configured to facilitate the input and output of audio signals to and from the electronic system under control of computer programs.

In some embodiments, the system module 100 further includes SSDs 112' coupled to the I/O controller 106 directly. Conversely, the SSDs 112 are coupled to the communication buses 140. In an example, the communication buses 140 operates in compliance with Peripheral Component Interconnect Express (PCIe or PCI-E), which is a serial expansion bus standard for interconnecting the processor module 102 to, and controlling, one or more peripheral devices and various system components including components 110-122.

Further, one skilled in the art knows that other non-transitory computer readable storage media can be used, as new data storage technologies are developed for storing information in the non-transitory computer readable storage media in the memory modules 104, SSDs 112 and 112', and hard drive 114. These new non-transitory computer readable storage media include, but are not limited to, those manufactured from biological materials, nanowires, carbon nanotubes and individual molecules, even though the respective data storage technologies are currently under development and yet to be commercialized.

Figure 2:
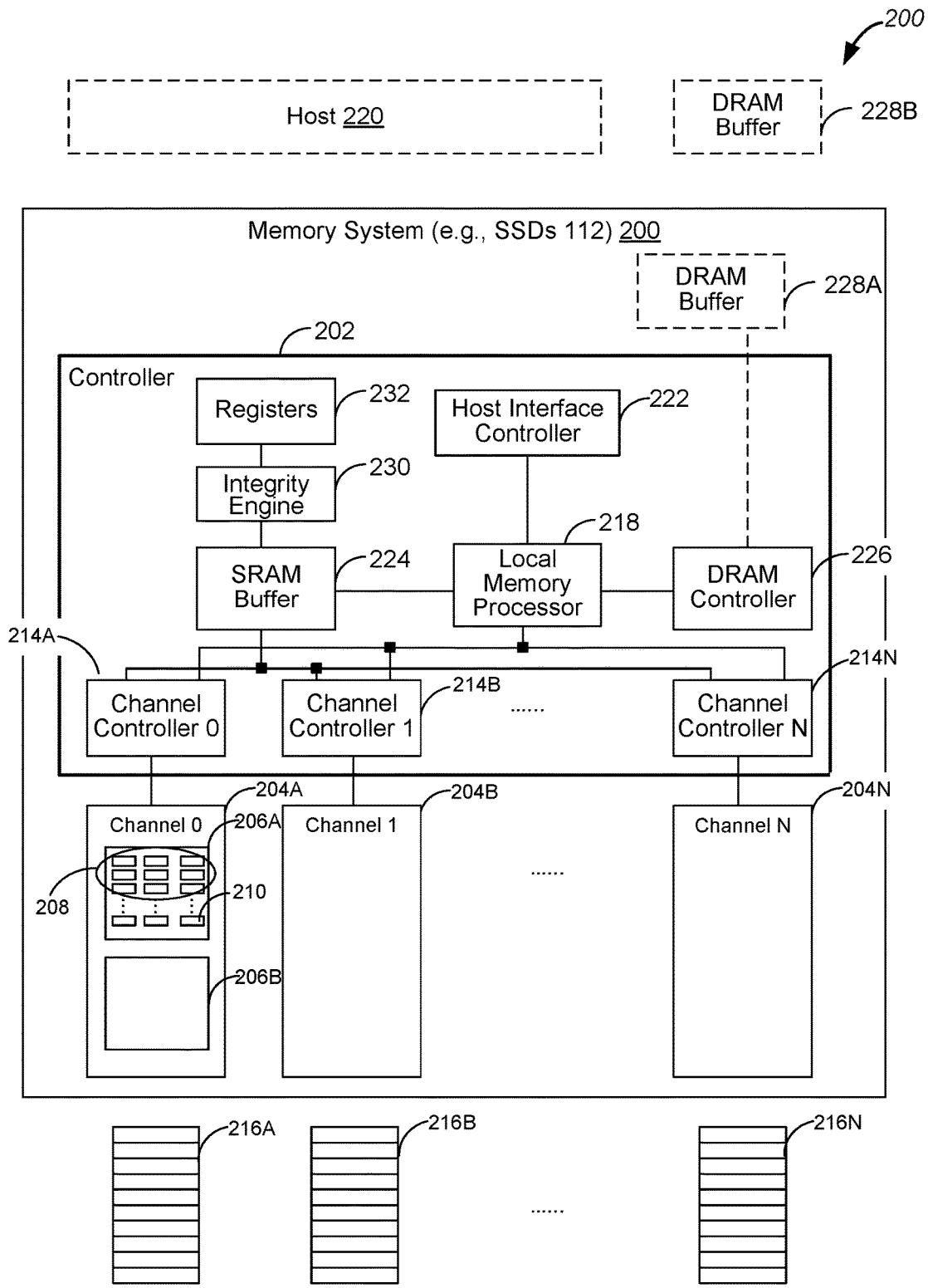
FIG. 2 is a block diagram of a memory system of an example electronic system having one or more memory access queues, in accordance with some embodiments.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system and execute user applications. The memory system 200 further includes a controller 202 and a plurality of memory channels 204 (e.g., channel 204A, 204B, and 204N). Each memory channel 204 includes a plurality of memory cells. The controller 202 is configured to execute firmware level software to bridge the plurality of memory channels 204 to the host device 220.

Each memory channel 204 includes on one or more memory packages 206 (e.g., two memory dies). In an example, each memory package 206 (e.g., memory package 206A or 206B) corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory system 200 includes a plurality of superblocks. Each superblock includes a plurality of memory blocks each of which further includes a plurality of memory pages 210. For each superblock, the plurality of memory blocks are configured to be written into and read from the memory system via a memory input/output (I/O) interface concurrently. Optionally, each superblock groups memory cells that are distributed on a plurality of memory planes 208, a plurality of memory channels 204, and a plurality of memory dies 206. In an example, each superblock includes at least one set of memory pages, where each page is distributed on a distinct one of the plurality of memory dies 206, has the same die, plane, block, and page designations, and is accessed via a distinct channel of the distinct memory die 206. In another example, each superblock includes at least one set of memory blocks, where each memory block is distributed on a distinct one of the plurality of memory dies 206 includes a plurality of pages, has the same die, plane, and block designations, and is accessed via a distinct channel of the distinct memory die 206. The memory system 200 stores information of an ordered list of superblocks in a cache of the memory system 200. In some embodiments, the cache is managed by a host driver of the host device 220, and called a host managed cache (HMC).

In some embodiments, the memory system 200 includes a single-level cell (SLC) NAND flash memory chip, and each memory cell stores a single data bit. In some embodiments, the memory system 200 includes a multi-level cell (MLC) NAND flash memory chip, and each memory cell of the MLC NAND flash memory chip stores 2 data bits. In an example, each memory cell of a triple-level cell (TLC) NAND flash memory chip stores 3 data bits. In another example, each memory cell of a quad-level cell (QLC) NAND flash memory chip stores 4 data bits. In yet another example, each memory cell of a penta-level cell (PLC) NAND flash memory chip stores 5 data bits. In some embodiments, each memory cell can store any suitable number of data bits. Compared with the non-SLC NAND flash memory chips (e.g., MLC SSD, TLC SSD, QLC SSD, PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 (e.g., controller 214A, 214B, or 214N) configured to control internal and external requests to access memory cells in the respective memory channel 204. In some embodiments, each memory package 206 (e.g., each memory die) corresponds to a respective queue 216 (e.g., queue 216A, 216B, or 216N) of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory system 200 corresponds to a single queue 216 of memory access requests. Each memory access request is optionally received internally from the memory system 200 to manage the respective memory channel 204 or externally from the host device 220 to write or read data stored in the respective channel 204. Specifically, each memory access request includes one of: a system write request that is received from the memory system 200 to write to the respective memory channel 204, a system read request that is received from the memory system 200 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a memory controller to implement internal memory management functions including, but are not limited to, garbage collection, wear levelling, read disturb mitigation, memory snapshot capturing, memory mirroring, caching, and memory sparing.

In some embodiments, in addition to the channel controllers 214, the controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and read from the plurality of memory channels 204 on a memory block basis. Data of one or more memory blocks are written into, or read from, the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the controller 202. Alternatively, in some embodiments, the local memory processor 218 stores data to be written into, or read from, each memory block in the plurality of memory channels 204 in a DRAM buffer 228A that is included in memory system 200, e.g., by way of the DRAM controller 226. Alternatively, in some embodiments, the local memory processor 218 stores data to be written into, or read from, each memory block in the plurality of memory channels 204 in a DRAM buffer 228B that is main memory used by the processor module 102 (FIG. 1). The local memory processor 218 of the controller 202 accesses the DRAM buffer 228B via the host interface controller 222.

In some embodiments, data in the plurality of memory channels 204 is grouped into coding blocks, and each coding block is called a codeword. For example, each codeword includes n bits among which k bits correspond to user data and (n-k) corresponds to integrity data of the user data, where k and n are positive integers. In some embodiments, the memory system 200 includes an integrity engine 230 (e.g., an LDPC engine) and registers 232 including a plurality of registers or SRAM cells or flip-flops and coupled to the integrity engine 230. The integrity engine 230 is coupled to the memory channels 204 via the channel controllers 214 and SRAM buffer 224. Specifically, in some embodiments, the integrity engine 230 has data path connections to the SRAM buffer 224, which is further connected to the channel controllers 214 via data paths that are controlled by the local memory processor 218. The integrity engine 230 is configured to verify data integrity for each coding block of the memory channels 204.

Figure 3:
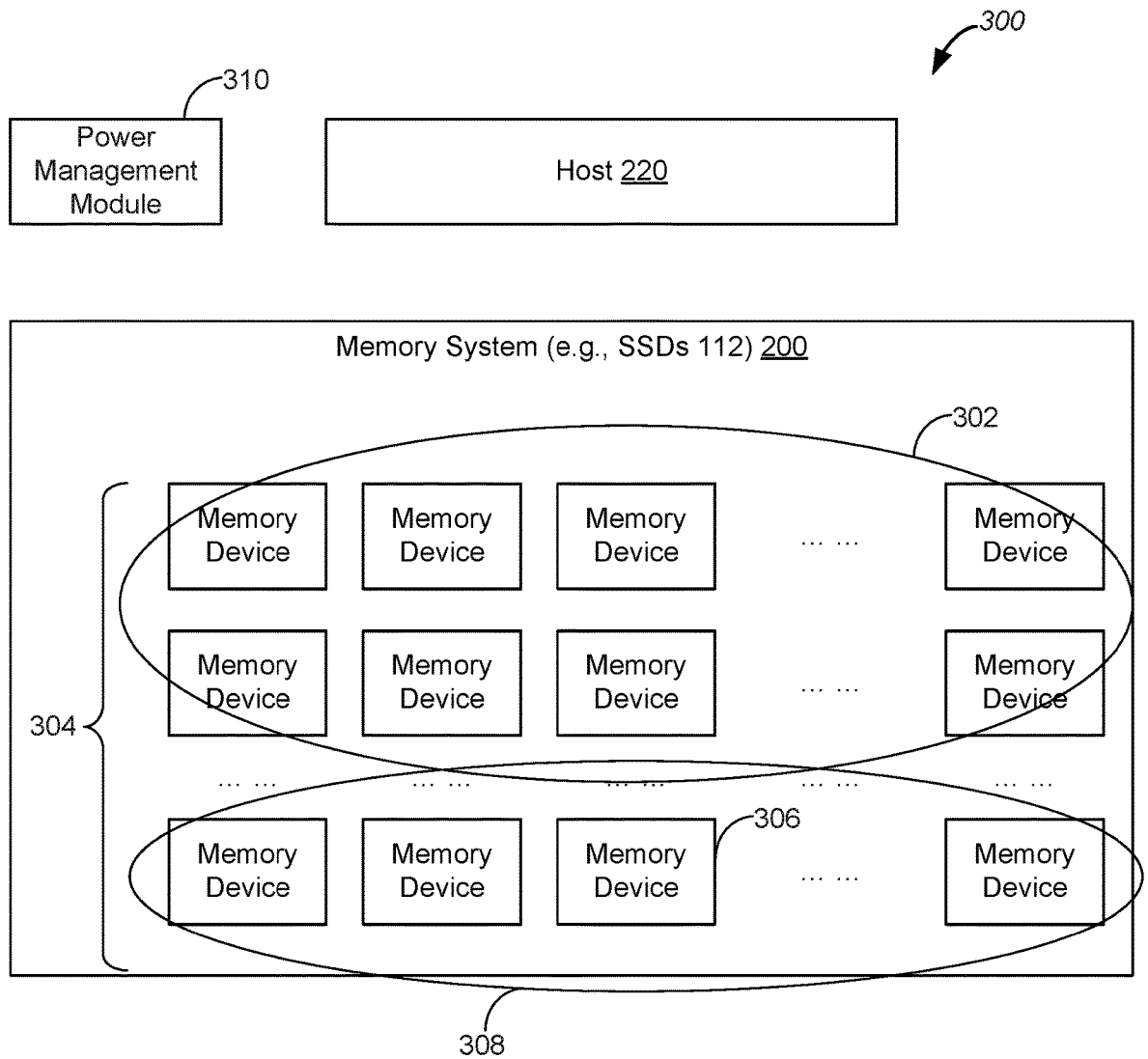
FIG. 3 is a block diagram of an example electronic system, in accordance with some embodiments.

FIG. 3 is a block diagram of an example electronic system 300, in accordance with some embodiments. The electronic system 300 includes a host device 220 (e.g., a processor module 102 in FIG. 1) and a memory system 200 coupled to the host device 220. The memory system 200 is configured to store instructions and data for an extended time, e.g., when the electronic system 300 sleeps, hibernates, or is shut down. The host device 220 is configured to access the instructions and data stored in the memory system 200 and process the instructions and data to run an operating system and execute user applications. The memory system 200 further includes a plurality of memory devices 302. Each memory devices 302 includes a memory controller 202 and one or more memory channels 204 each having a plurality of memory cells. The controller 202 is configured to execute firmware level software to bridge the plurality of memory devices 302 to the host device 220. In an example, a memory device 302 includes 8 memory channels, and each memory channel further includes 8 memory dies 206. Each memory die 206 includes 2 memory planes 208 or arrays. Each memory plane 208 further includes a plurality of memory pages 210. Each memory page 210 includes an ordered set of memory cells, and each memory cell is identified by a respective physical address.

In some embodiments, each of the plurality of memory devices 302 operates in a power range having an upper power limit P0 (e.g., 5 W), and the plurality of memory devices 302 has a predefined power budget PB that is less than a predefined portion of a sum of upper power limits of all of the plurality of memory devices 302. For example, the upper power limit P0 of each memory device 302 is 25 W and corresponds to a memory write mode, e.g., in which data is written in parallel to all memory dies 206 of the respective memory device 302. The plurality of memory device 302 include 10 memory devices, and therefore has a sum, of upper power limits, equal to 250 W. The predefined power budget PB is set as one of 100 W, 125 W, 150 W, and 200 W, which is lower than 250 W. More specifically, the predefined power budget PB is set below 85% or 90% of the sum of upper power limits of all memory devices 302 of the memory system 200.

In some embodiments, the electronic system 300 includes a power management module 310 configured to provide power to the memory devices 304 of the memory system 200. The electronic system 300 (e.g., a data server) never needs to operate all of its memory devices (e.g., SSDs) at the upper power limit P0 simultaneously, which each individual memory device 302 needs to operate at its upper power limit P0. The predefined power budget PB is set below the sum of upper power limits of all of the plurality of memory devices 302 without compromising the upper power limits P0 of each individual memory device 302. The power management module 310 can be sized down and made with a lower cost to provide the predefined power budget PB for the plurality of memory devices 302 as a whole and the upper power limit P0 of each individual memory device 302.

In some embodiments, the electronic system 200 includes a set of memory devices 304. The plurality of memory devices 302 are a subset of the set of memory devices 304. The host device 220 selects the subset of the set of memory devices 302 as the plurality of memory devices 304. In some situations, the host device 220 includes a system-level IO controller 106 (FIG. 1). The plurality of memory devices 302 is arranged to a ring of memory devices (e.g., a ring 440 in FIG. 4A). A power data packet is passed along a power control path that tracks the ring of memory devices. Based on a direction of the power control path, each of the plurality of memory devices 302 is assigned with an upstream memory device and a downstream memory device. In some embodiments, the plurality of memory devices 302 include all memory devices in the memory system 200. In some embodiments, the memory system includes one or more remaining memory devices 306 that are distinct from the plurality of memory devices 302 and not arranged in the power control path. In some embodiments, the plurality of memory devices 302 form a first ring of memory devices, and a subset or all of the remaining memory devices 306 forms a second ring 308 of memory devices. Each ring of memory devices has a distinct predefined power budget PB, and is configured to operate with a total power consumption no more than the distinct predefined power budget PB.

The predefined power budget PB is dynamically distributed among the plurality of memory devices 302 as the power data packet is passed along the ring of memory devices. Power consumption of each memory device 302 includes an input/output (I/O) power that varies based on a type (e.g., TLC, QLC, PLC) of the respective memory device 302. For example, the I/O power of a PLC-based NAND flash memory chip is greater than that of a QLC-based NAND flash memory chip, which is greater than that of a TLC-based NAND flash memory chip. A spread of power consumption of a read operation and a write operation increases successively for SLC-, MLC-, TLC-, QLC-, and PLC-based NAND flash memory chips. Stated another way, the spread of power consumption of the read operation and the write operation increases with an endurance level of a memory device 302. The I/O power also varies with a type of a data transmission protocol of an I/O interface. For example, a memory device using PCIe 5.0 is configured to execute random read operations under the upper power limit P0 of 25 W, which has to be lifted up for a memory device using PCIe 6.0 to execute random read operations. As a workload of memory device 302 increases (e.g., the workload includes more random write operations), the power consumption of the memory device 302 increases. Additionally, as a drive capacity utilization rate of a memory device 302 increases, the power consumption of memory device 302 needed for a write operation increases.

Figure 4A:
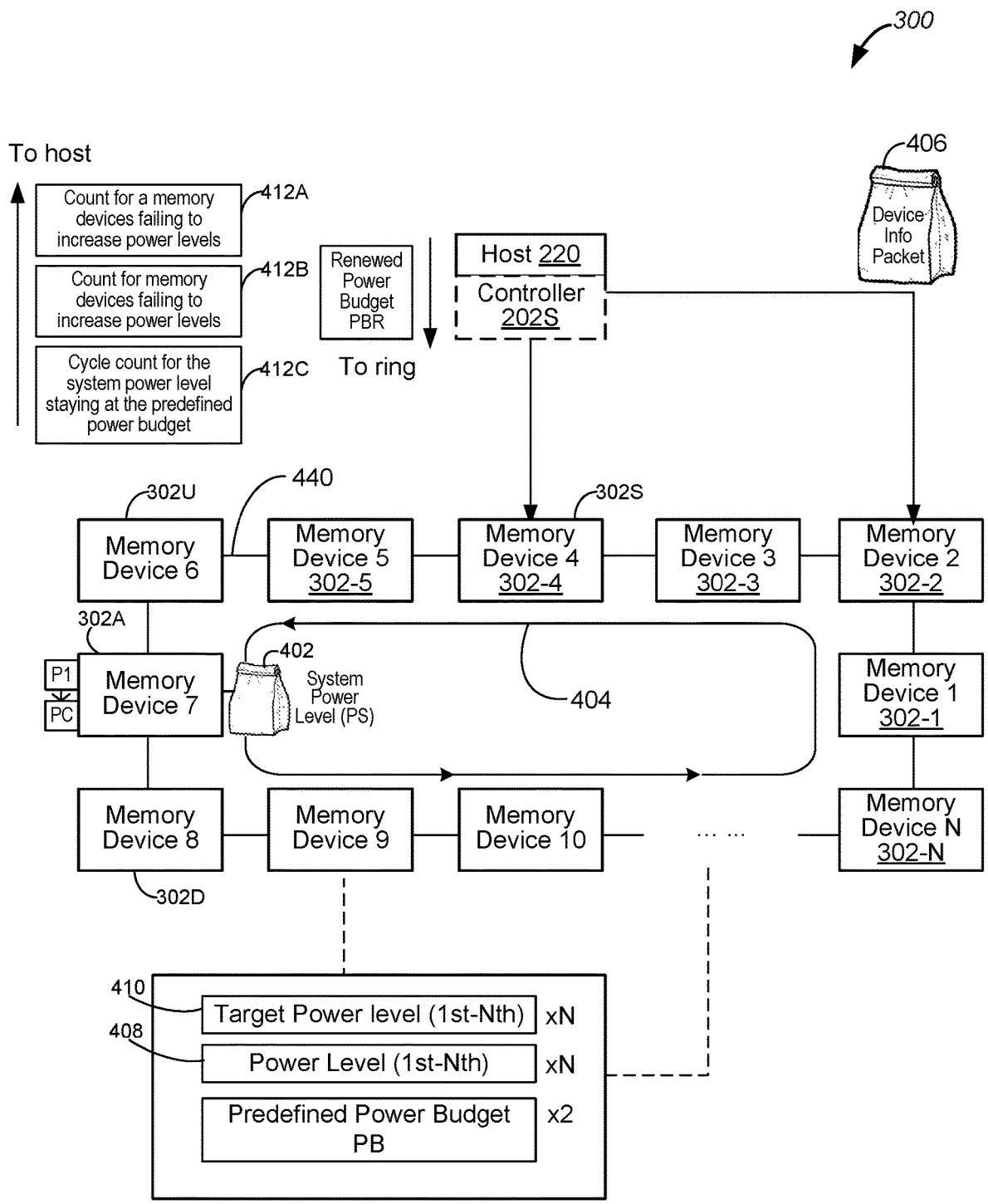
FIG. 4A is a block diagram of another example electronic system in which a plurality of memory devices pass a power data packet on a ring, in accordance with some embodiments.
Figure 4B:
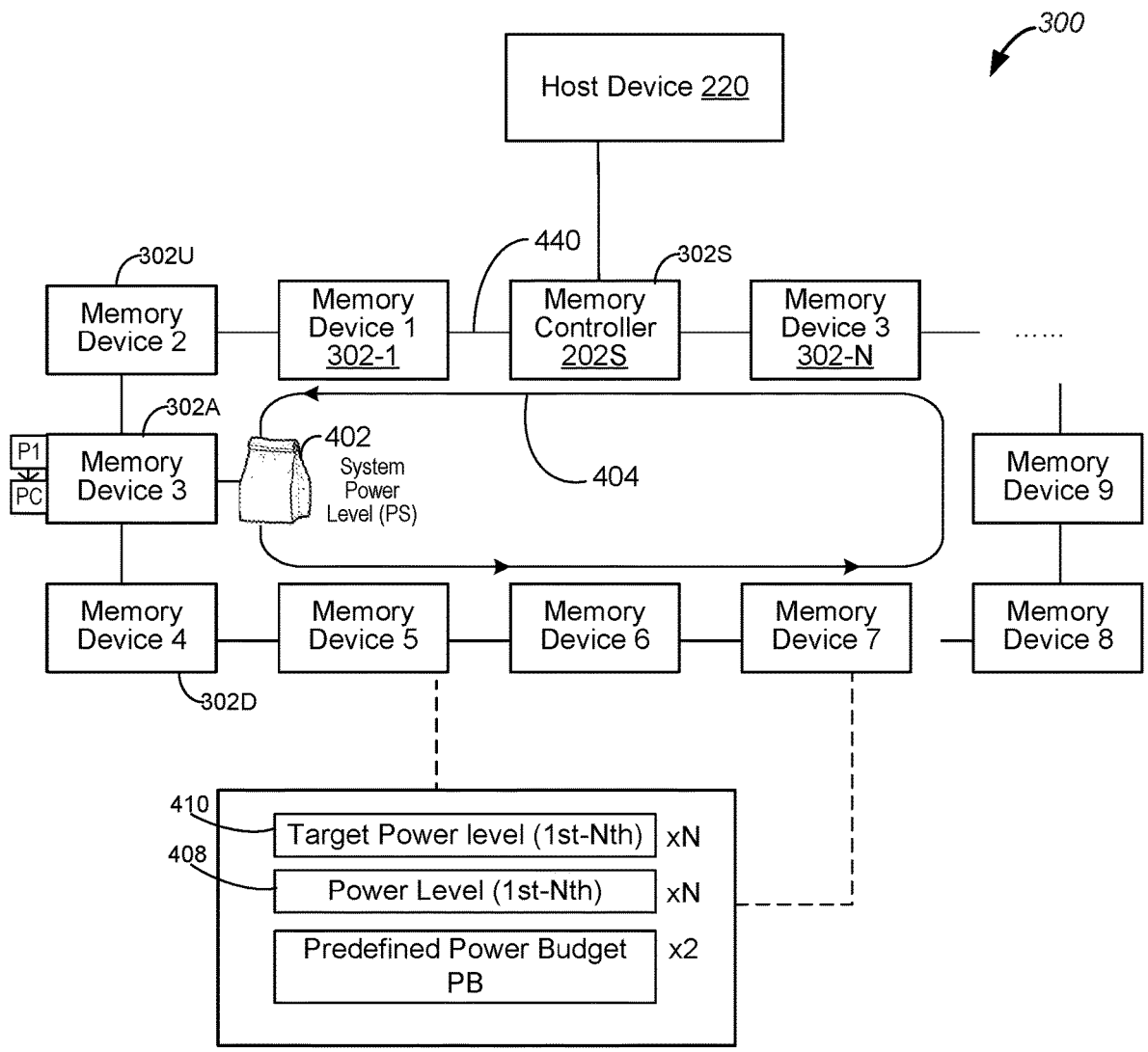
FIG. 4B is a block diagram of another example electronic system in which a first memory device receives a power data packet via a ring of memory devices, in accordance with some embodiments.

FIG. 4A is a block diagram of another example electronic system 300 in which a plurality of memory devices 302 pass a power data packet 402 on a ring 440, in accordance with some embodiments, and FIG. 4B is a block diagram of another example electronic system 300 in which a first memory device 302A receives a power data packet 402 via a ring 440 of memory devices, in accordance with some embodiments. The electronic system 300 is configured to manage power consumption of the plurality of memory devices 302 dynamically. The plurality of memory devices 302 are coupled into the ring 440 (also called loop) of memory devices. The plurality of memory devices 302 have N memory devices (e.g., 302-1, 302-2, 302-3, . . . , and 302-N), where N is a positive integer greater than 1. In an example, a memory device 302-1 is coupled to a memory device 302-2, which is further coupled to a memory device 302-3. The memory device 302-3 is coupled to a memory device 302-4, which is further coupled to a memory device 302-3. Referring to FIG. 4A, the memory device 302-3 is coupled to the memory device 302-4, to a memory device 302-5, . . . , and to a memory device 302-N, successively. The memory device 302-N is coupled to the memory device 302-1. The power data packet 402 is passed along a power control path 404 that tracks the ring 440 of memory devices continuously. The power data packet 402 includes at least a system power level PS indicating total power consumption of the plurality of memory devices 302.

In some embodiments, the electronic system 300 includes a set of memory devices (e.g., memory devices 304 in FIG. 2). A subset of the set of memory devices is selected as the plurality of memory devices 302 (e.g., 302-1, . . . , 302-N), which is arranged the ring 440 of memory devices. In accordance with the power control path 404 that tracks the ring 440 of memory devices, each memory device 302 is assigned with an upstream memory device 302U and a downstream memory device 302D of the respective memory device. In some embodiments, each of the plurality of memory devices 302 receives from a host device 220 a device information packet including information of the upstream memory device 302U and the downstream memory device 302D of the respective memory device 302. Alternatively, in some embodiments, a start memory device 302S (e.g., 302-4) receives a device information packet 406 including information of the upstream memory device 302U and the downstream memory device 302D of each and every of the plurality of memory devices 302. The start memory device 302S passes the device information packet 406 along the power control path 404 that tracks the ring 440 of memory devices. Each remaining memory device 302 identifies the respective upstream memory device 302U and the respective downstream memory device 302D based on the device information packet 406.

In some embodiments, each of the plurality of memory devices 302 operates in a power range having an upper power limit P0, and the plurality of memory devices 302 have a predefined power budget PB that is less than a predefined portion of a sum of upper power limits P0 of all of the plurality of memory devices 302. Under some circumstances, before receiving the power data packet 402, the start memory device 302S is initialized to set the system power level PS at the predefined power budget PB and set a plurality of device power levels of the plurality of memory devices 302 to be equal to one another. A sum of the plurality of device power levels is equal to the predefined power budget PB. The start memory device 302S updates the system power level PS and device power level in response to receiving the power data packet 402. Further, in some embodiments, each of the plurality of memory devices 302 is initialized with the predefined power budget PB and an equal device power level, which are updated upon receiving the power data packet 402. Alternatively, under some circumstances, before receiving the power data packet 402, the start memory device 302S is initialized to set the system power level PS at the predefined power budget PB, device power levels of a first subset of memory devices 302 at the upper power limit P0, and device power levels of a first subset of memory devices 302 at 0. A sum of the device power levels is equal to the predefined power budget PB. The start memory device 302S updates the system power level PS and its own current power level PC in response to receiving the power data packet 402. Further, in some embodiments, each of the plurality of memory devices 302 is initialized with the predefined power budget PB and the respective device power level (e.g., the upper power limit P0 or 0), which are updated upon receiving the power data packet 402.

During a current cycle, a first memory device 302A receives the power data packet 402 from an upstream memory device 302U on the power control path 404. The power data packet 402 includes at least a system power level PS indicating total power consumption of the plurality of memory devices 302. In some embodiments, the power data packet 402 includes detailed power distribution of the system power level PS among the plurality of memory devices 302, i.e., a plurality of power levels of the plurality of memory devices. The first memory device 302A sets a current power level PC of the first memory device 302A based on the received power data packet, updates the power data packet 402 based on the current power level PC, and sends the updated power data packet to a downstream memory device 302D on the power control path 404.

As the first memory device 302A receives the power data packet 402, an existing power level 408 (P1) of the first memory device 302A is set during a prior cycle that precedes the current cycle. In some situations, the first memory device 302A has a target operation mode corresponding to a target power level 410 during the current cycle, and the target power level 410 is greater than the existing power level 408 (P1) of the first memory device 302A. The first memory device 302A compares the system power level PS with a predefined power budget, and determines whether a difference of the system power level PS and the predefined power budget covers a difference of the target power level 410 and the existing power level 408 (P1). In accordance with a determination that the difference of the system power level PS and the predefined power budget covers the difference of the target power level 410 and the existing power level 408 (P1), the current power level PC of the first memory device 302A is set to the target power level 410.

In some embodiments, the power data packet 402 includes the existing power level 408 (P1) of the first memory device 302A, and the first memory device 302A retrieves the existing power level 408 (P1) from the power data packet 402. Alternatively, in some embodiments, the power data packet 402 does not include the existing power level 408 (P1) of the first memory device 302A, and the first memory device 302A stores the existing power level 408 (P1) locally and extracts the existing power level 408 (P1) from local memory of the first memory device 302A.

In some embodiments, the power data packet 402 further includes the predefined power budget PB defining an upper limit of a total power of the plurality of memory devices 302. Alternatively, in some embodiments, the predefined power budget PB is provided to each of the plurality of memory devices 302 separately from the power data packet 402, and stored locally in the respective memory device 302. In some embodiments, the power data packet 402 further includes a first power level of the first memory device 302A set during a most recent cycle that precedes the current cycle. The existing power level 408 (P1), which the first memory device 302A has at the time of receiving the power data packet 402, is equal to the first power level of the first memory device 302A. Alternatively, in some embodiments, the first power level of the first memory device 302A is stored locally in the first memory device 302A. In some embodiments, the power data packet 402 further includes a target power level 410 of the first memory device 302A during the current cycle. Alternatively, in some embodiments, the target power level 410 of the first memory device 302A is stored locally in the first memory device 302A. Additionally, a power level of each remaining memory device on the ring 440 is set during the most recent cycle is optionally received via the power data packet 402 or stored locally in the respective memory device, so is the target power level 410 of each remaining memory device on the ring 440.

In some embodiments not shown, the ring 440 of memory devices further includes a host device 220. The host device 220 is coupled downstream of a second memory device and upstream of a third memory device on the power control path 404. The host device 220 monitors the system power level PS and a plurality of device power levels of the plurality of memory devices 302. Alternatively, in some embodiments, one of the host device 220 is coupled to each and every one of the plurality of memory devices 302, and monitors the system power level PS and the plurality of device power levels.

In some embodiments, in accordance with a determination that a power shortage condition is satisfied, the predefined power budget PB is increased to a renewed power budget RBR. The system power level PB is configured to vary below the predefined power budget that is updated to the renewed power budget PBR. Further, in some embodiments, the renewed power budget RBR is provided by the host device 220 coupled to one of the plurality of memory devices 302 (e.g., 302-2). Alternatively, in some embodiments, the predefined power budget is automatically increased by a predefined budget increase (e.g., 5 W) or scaled by a predefined power scaler (e.g., 1.1) to generate the renewed power budget PBR. Additionally, in some embodiments, the power shortage condition includes at least one of:

the system power level PB has stayed on a predefined power budget for a threshold duration of time, at least a predefined portion of the plurality of memory devices 302 fails to increase respective power levels during a prior cycle of passing the power data packet 402, and the first memory device 302A fails to increase the first power level for at least a first number of cycles.

In some embodiments, the power shortage condition is identified at any of the plurality of memory devices 302 locally (e.g., by a memory controller 202), which optionally reports the power shortage condition to the host device 220. Alternatively, in some embodiments, a plurality of power state parameters 412A-412C are monitored and circulated on the power control path 404. For example, the plurality of power state parameters include, but are not limited to, a count 412A for a memory devices 302 failing to increase power levels during a prior cycle, a count 412B for memory devices 302 failing to increase power levels, and a count of cycles 412C for the system power level PS staying at the predefined power budget. A memory device 302 located on the power control path 404 identifies the power shortage conditions based on the plurality of power state parameters 412A-412C, renews the power budget level PB, and sends to the ring 440 an instruction to renew the power budget level PB. Optionally, the memory device 302 located on the power control path 404 is a fixed memory device 302 (e.g., a start memory device 302S) or any one of the plurality of memory devices 302. Alternatively, in some embodiments, the memory devices 302 report the plurality of power state parameters 412A-412C to the host device 220, which identifies the power shortage conditions and renews the power budget level PB. The host device 220 optionally sends, to the ring 440, an instruction to renew the power budget level PB via a fixed memory device 302 (e.g., a start memory device 302S) or via more than one or all of the plurality of memory devices 302.

In some embodiments, the power data packet 402 is communicated among the plurality of memory devices to leverage a system characteristic where workloads across different memory devices 302 are not evenly distributed when measured in seconds or minutes. A power level of a memory device 302 varies when the memory device 302 operates in an idle mode, a read mode, or a write mode. For example, the power level of each memory device 302 can swing between a first power of the idle mode (e.g., 5 W) and a second power of the write mode (e.g., 25 W), while the power level rarely hits the second power. It almost never happens that all of the plurality of memory devices 302 operate at the second power concurrently. As such, each individual memory device 302 is allowed to use the second power, while the system power level PB of the plurality of memory devices 302 is controlled on or below the predefined power budget PB. The predefined power budget PB is less than a product of the second power and a total number of memory devices 302. This enables a cost effective electronic system configured for normal operations and efficient power consumption.

In an example, a first electronic system has 10 SSDs, and each SSD has an upper limit of 25 W for power consumption. An upper limit for total power consumption of the first electronic system is 250 W. The electronic system is configured to provide and manage a power of 250 W for the 10 SSDs. A second electronic system has 10 SSDs, and each SSD has an upper limit of 12.5 W for power consumption. An upper limit for total power consumption of the second electronic system is 125 W. Performance of each SSD is limited by the upper limit of each SSD's power consumption. Despite cost efficiency, the second electronic system compromises performance of each of the 10 SSDs compared with the first electronic system. In contrast, in some embodiments of this application, a third electronic system (e.g., 300 in FIG. 4A) has 10 SSDs, and each SSD has an upper limit of 25 W for power consumption. Given that each SSD rarely consumes 25 W and that it almost never happens with all of the SSDs consuming 25 W at the same time, an upper limit for total power consumption of the third electronic system (i.e., a predefined power budget) is set at 125 W, and power consumption of each SSD is dynamically controlled to consume up to 25 W, while the total power consumption of the 10 SSDs is controlled below 125 W. The third electronic system enables analogous data storage performance to that of the first electronic system, while keeping a total power consumption at a reduced system power level and reducing requirements for power management.

In some embodiments, a host device 220 configures a ring 440 of SSDs. The ring 440 of SSDs optionally includes a subset or all of SSDs of an electronic system 300 (e.g., a server). The host device 220 sets the power budget level PB (also called MaxRingPOwer) to be applied across the ring 404 of SSDs. The ring 440 of SSDs requires standards definition for full deployment using, NVMe or PCI-SIG. Error state defaults an upper power limit of each SSD to a level equal to MaxRingPower divided by a total number of SSDs in the ring 440. A conservative fault state is defined to keep the total power consumption of the ring 440 within the power budget level PB, while not all of the SSDs can perform their upper power limits P0. During normal operation, the power data packet 402 (also called PowerPacket) is passed from SSD to SSD in the ring 440 using PCIe Peer-to-Peer communication. In some situations, it takes 100 μsec to communicate the power data packet 402 between two SSDs and 1 msec to communicate the power data packet 402 over 10 SSDs in an entire cycle. In an example, the power data packet 402 reaches a first SSD having an existing power level 408 (P1) and requesting a target power level 410. The power data packet 402 includes a system power level that is assessed against the power budget level PB (MaxRingPOwer). The first SSD adjusts its power level based on a difference of the system power level and the power budget level PB.

Performance of dynamic power control for the memory system 200 is associated with one or more of a ring latency, a SSD duty cycle, a burst response time, workload characteristics, a workload on each individual drive, maximum required performance for a server, I/O sizes for reads and writes, a ratio between read and write operations, an SSD IO duty cycle during max server load, the idle to max number of IO ramp up and ramp down times, synchronization of SSD workloads across the server, an acceptable burst power or time over the MaxRingPower, SSD fairness. In some embodiments, the power budget level PB is divided into two packets having a 180 degree phase shift in the ring 440.

Referring to FIG. 4B, in some embodiments, a plurality of memory devices 302 are coupled into the ring 440 of memory devices. A power data packet 402 is passed along a power control path 404 that tracks the ring 440 of memory devices continuously. During a current cycle of the power data packet 402 passing on the ring 440, a first memory device 302A receives the power data packet 402 from an upstream memory device 302U on the power control path 404. The power data packet 402 includes at least a system power level PS indicating total power consumption of the plurality of memory devices 302. The first memory device 302A sets a current power level PC of the first memory device 302A based on the received power data packet, updates the power data packet 404 based on the current power level PC, and sends the updated power data packet 402 to a downstream memory device 302D on the power control path 404.

In some embodiments, the first memory device 302A determines a first power level 408 of the first memory device 302A during a most recent cycle that precedes the current cycle. The first power level 408 is optionally provided by the power data packet 402 or extracted locally from memory of the first memory device 302A. The first memory device 302A identifies a target power level 410 associated with the current cycle of the first memory device 302A and compares the first power level 408 and the target power level 410. Further, in some embodiments, in accordance with a determination that the first power level 408 is greater than the target power level 410, the current power level PC of the first memory device is set to the target power level 410. The first power level 408 of the first memory device 302A is replaced with the current power level PC. The system power level PS of the power data packet 402 is reduced by a power variation between the first power level 408 and the target power level 410 of the first memory device 302A. The power data packet 402 is updated accordingly and passed to the downstream memory device 302D. Alternatively, in some embodiments, in accordance with a determination that the first power level 408 is less than the target power level 410, the current power level PC of the first memory device 302A is set based on the system power level PS and a predefined power budget PB.

Specifically, in some embodiments, the first memory device 302A determines a first power level 408 of the first memory device set during a most recent cycle that precedes the current cycle, and identifies a target power level 410 associated with the current cycle of the first memory device 302A. The first memory device 302A determines whether a first difference between the first power level 408 and the target power level 410 of the first memory device is greater than a second difference between the system power level PS and a predefined power budget PB. Further, in some situations, in accordance with a determination that the first difference is less than the second difference (i.e., remaining power budget is sufficient to enable the target power level 410), the current power level PC of the first memory device 302A is set to the target power level 410. Additionally, in some embodiments, the first power level 408 of the power data packet is replaced with the current power level PC. The power data packet 402 is updated to include the system power level PS that is increased by a power variation between the first power level 408 and the target power level 410 of the first memory device 302A.

Conversely, in some situations, in accordance with a determination that the first difference is greater than the second difference (i.e., remaining power budget is not sufficient to enable the target power level 410), the current power level PC of the first memory device is set on the first power level 408 that exists and is already applied, and updating the power data packet further includes keeping the system power level of the power data packet. The power data packet is not changed at all. Conversely, in some situations, in accordance with a determination that the first difference is greater than the second difference (i.e., remaining power budget is not sufficient to enable the target power level 410), the current power level PC of the first memory device 302A is set to a sum of the first power level and the second difference. Any remaining power budget is fully used to increase the power level of the first memory device 302A, although the power level of the first memory device 302A is not raised to the target power level 410 yet. As a result, in some embodiments, the first power level 408 of the first memory device 302A is replaced with the current power level PC, and the power data packet 402 is updated such that the system power level PS of the power data packet 402 is increased to the predefined power budget PB.

Figure 5:
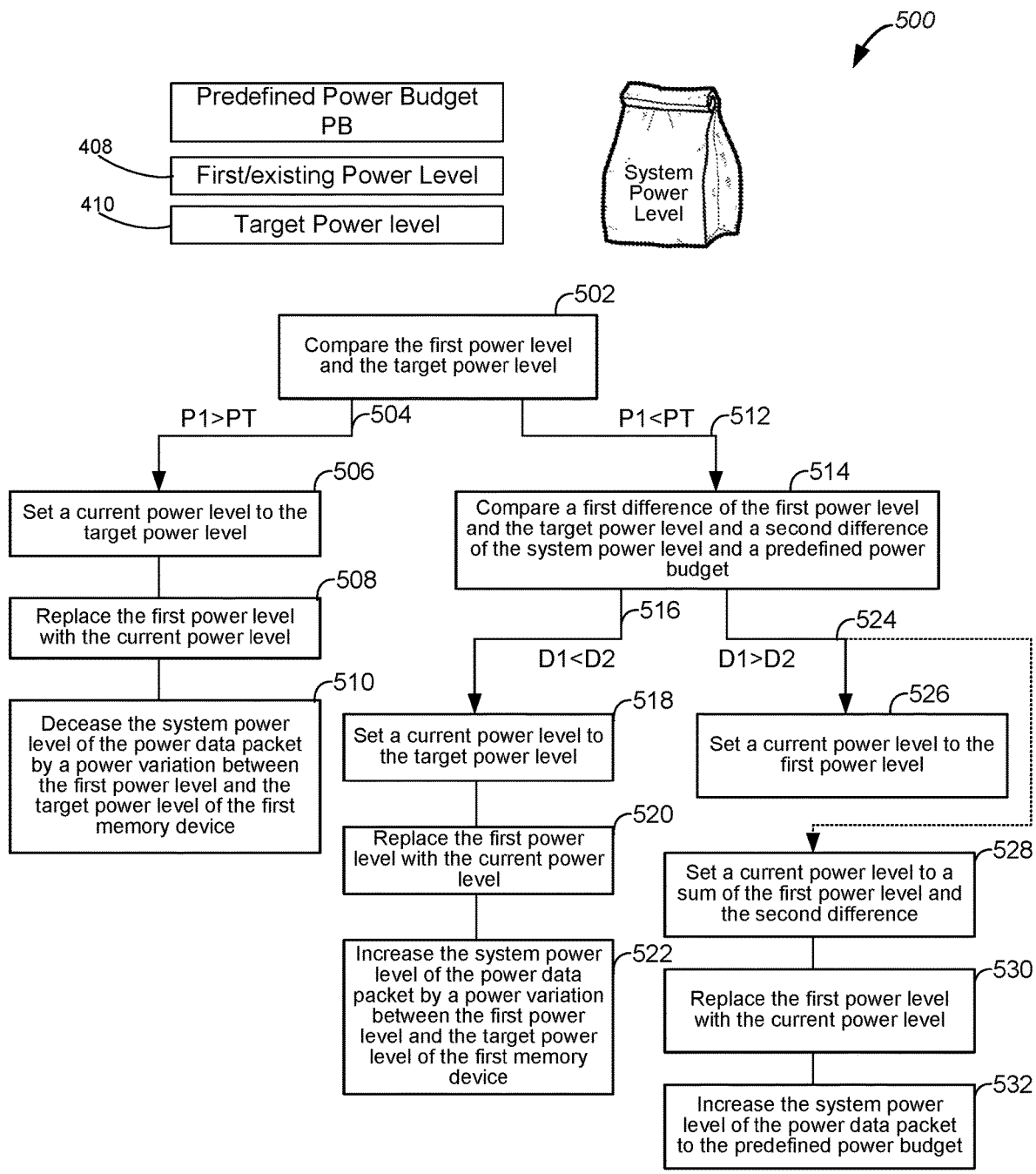
FIG. 5 is a flow diagram of an example process of managing power of memory devices dynamically at each memory device of a ring of memory devices, in accordance with some embodiments.

FIG. 5 is a flow diagram of an example process 500 of managing power of memory devices 302 dynamically at each memory device 302 (e.g., a first memory device 302A) of a ring 440 of memory devices 302, in accordance with some embodiments. During a current cycle of passing a power data packet 402 on the ring 440, the first memory device 302A receives the power data packet 402. The first memory device 302A determines a first power level 408 (P1) (also called an existing power level 408) of the first memory device 302A set during a most recent cycle that precedes the current cycle, and identifies a target power level 410 (PT) associated with the current cycle of the first memory device 302A. The first memory device 302A compares (operation 502) the first power level 408 (P1) and the target power level 410 (PT). In accordance with a determination (operation 504) that the first power level 408 (P1) is greater than the target power level 410 (PT), the current power level PC of the first memory device 302A is set (operation 506) to the target power level 410 (PT). The first power level 408 (P1) of the first memory device 302A is replaced (operation 508) with the current power level PC. The system power level PS of the power data packet 402 is reduced (operation 510) by a power variation (P1-PT) between the first power level 408 (P1) and the target power level 410 (PT) of the first memory device 302A. The power data packet 402 is updated accordingly and passed to the downstream memory device 302D. Alternatively, in some embodiments, in accordance with a determination that the first power level 408 (P1) is less than (operation 512) the target power level 410 (PT), the current power level PC of the first memory device 302A is set based on the system power level PS and a predefined power budget PB.

Specifically, in some embodiments, the first memory device 302A determines (operation 514) whether a first difference D1 between the first power level 408 (P1) and the target power level 410 (PT) of the first memory device 302A is greater than a second difference D2 between the system power level PS and a predefined power budget PB. Further, in some situations, in accordance with a determination that the first difference D1 is less (operation 516) than the second difference D2 (i.e., remaining power budget is sufficient to enable the target power level 410), the current power level PC of the first memory device 302A is set (operation 518) to the target power level 410 (PT). Additionally, in some embodiments, the first power level 408 (P1) of the power data packet is replaced (operation 520) with the current power level PC. The power data packet 402 is updated to include the system power level PS that is increased (operation 522) by the power variation (i.e., D1) between the first power level 408 (P1) and the target power level 410 (PT) of the first memory device 302A.

Conversely, in some situations, in accordance with a determination (operation 524) that the first difference D1 is greater than the second difference D2 (i.e., remaining power budget is not sufficient to enable the target power level 410), the current power level PC of the first memory device 302A is set (operation 526) on the first power level 408 (P1) that exists and is already applied, and updating the power data packet further includes keeping the system power level PS of the power data packet 402. The power data packet is not changed at all. Conversely, in some situations, in accordance with a determination (operation 524) that the first difference is greater than the second difference (i.e., remaining power budget is not sufficient to enable the target power level 410), the current power level PC of the first memory device 302A is set (operation 528) to a sum of the first power level 408 (P1) and the second difference D2. Any remaining power budget is fully used to increase the power level of the first memory device 302A to the current power level PC, although the power level of the first memory device 302A is not raised to the target power level 410 (PT) yet. As a result, in some embodiments, the first power level 408 (P1) of the first memory device 302A is replaced (operation 530) with the current power level PC, and the power data packet 402 is updated such that the system power level PS of the power data packet 402 is increased (operation 532) to the predefined power budget PB.

Figure 6:
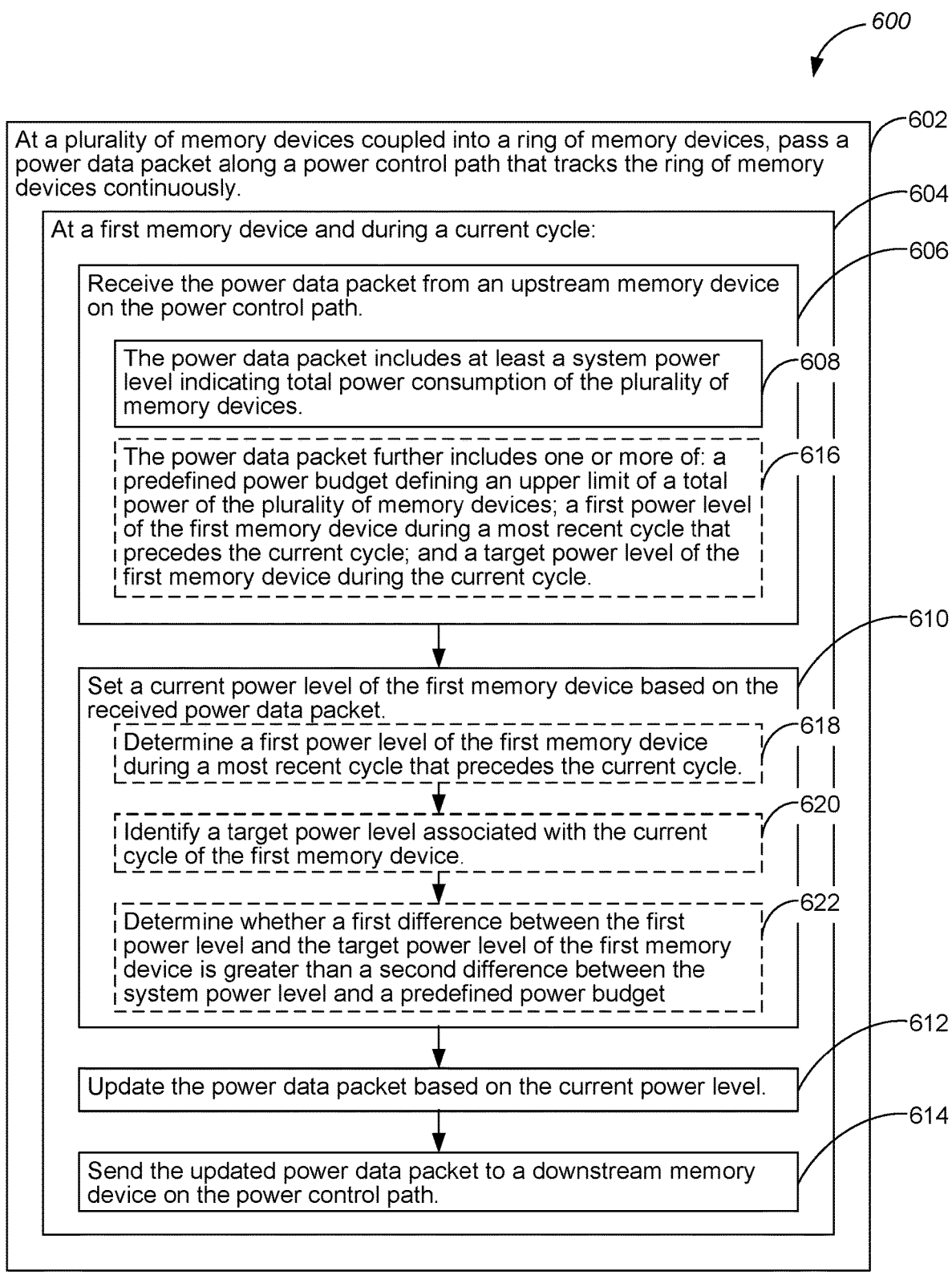
FIG. 6 a flow diagram of an example method for managing power of memory devices dynamically in an electronic system, in accordance with some embodiments.

FIG. 6 a flow diagram of an example method 600 for managing power of memory devices 302 dynamically in an electronic system 300, in accordance with some embodiments. The electronic system further includes a host device 220 and a memory system 200 coupled to the host device 220, and the memory system 200 includes a plurality of memory devices 302 (e.g., SSDs). The plurality of memory devices 302 are coupled into a ring 440 of memory devices. The plurality of memory devices 302 passes (operation 602) a power data packet 402 along a power control path 404 that tracks the ring 440 of memory devices continuously. During a current cycle 604, a first memory device 302A receives (operation 606) the power data packet 402 from an upstream memory device 302U on the power control path 404, and the power data packet 402 includes (operation 608) at least a system power level PS indicating total power consumption of the plurality of memory devices 302. The first memory device 302A sets (operation 610) a current power level PC of the first memory device 302A based on the received power data packet 402, and updates (operation 612) the power data packet 402 based on the current power level PC. The first memory device 302A sends (operation 614) the updated power data packet 402 to a downstream memory device 302D on the power control path 404. More details on the ring 400 of memory devices are discussed above with reference to FIGS. 3 and 4A-4B.

In some embodiments, the power data packet 402 further includes (operation 616) one or more of: a predefined power budget PB defining an upper limit of a total power of the plurality of memory devices 302, a first power level P1 of the first memory device 302A during a most recent cycle that precedes the current cycle, and a target power level PT of the first memory device 302A during the current cycle. Alternatively, in some embodiments, the predefined power budget PB is stored locally and separately on each of a subset or all of the plurality of memory devices 302. In some embodiments, for each of a subset or all of the plurality of memory devices 302 (e.g., the first memory device 302A), a respective power level or a respective target power level PT of the respective memory device is stored locally and separately on the respective memory device. Specifically, in some embodiments, the first power level P1 or the target power level PT of the first memory device 302A is stored locally and separately on the first memory device 302A.

In some embodiments, the first memory device 302A determines a first power level P1 of the first memory device 302A set during a prior cycle (e.g., a most recent cycle) that precedes the current cycle, identifies a target power level PT associated with the current cycle of the first memory device 302A, and compares the first power level P1 and the target power level PT of the first memory device 302A. Further, in some embodiments, in accordance with a determination that the first power level P1 is greater than the target power level PT, the current power level PC of the first memory device 302A is set to the target power level PT. The first electronic system replaces the first power level P1 of the first memory device 302A with the current power level PC. Updating the power data packet 402 further includes decreasing the system power level PS of the power data packet 402 by a power variation between the first power level P1 and the target power level PT of the first memory device 302A. Conversely, in some embodiments, in accordance with a determination that the first power level P1 is less than the target power level PT, the current power level PC of the first memory device 302A is set based on the system power level PS and a predefined power budget PB.

In some embodiments, setting the current power level PC of the first memory device 302A further includes determining (operation 618) a first power level P1 of the first memory device 302A during a most recent cycle that precedes the current cycle, identifying (operation 620) a target power level PT associated with the current cycle of the first memory device 302A, and determining (operation 622) whether a first difference between the first power level P1 and the target power level PT of the first memory device 302A is greater than a second difference between the system power level PS and a predefined power budget PB. Further, in some embodiments, in accordance with a determination that the first difference is less than the second difference, the current power level PC of the first memory device 302A is set to the target power level PT. Additionally, in some embodiments, the first memory device 302A replaces the first power level P1 of the power data packet 402 with the current power level PC. Updating the power data packet 402 further includes increasing the system power level PS of the power data packet 402 by a power variation between the first power level P1 and the target power level PT of the first memory device 302A.

In some embodiments, in accordance with a determination that the first difference is greater than the second difference, the current power level PC of the first memory device 302A is set on the first power level P1, and updating the power data packet 402 further includes keeping the system power level PS of the power data packet 402. Conversely, in some embodiments, in accordance with a determination that the first difference is greater than the second difference, the current power level PC of the first memory device 302A is set to a sum of the first power level P1 and the second difference. Additionally, in some embodiments, the first memory device 302A replaces the first power level P1 of the first memory device 302A with the current power level PC. Updating the power data packet 402 includes increasing the system power level PS of the power data packet 402 to the predefined power budget PB.

In some embodiments, the ring 440 of memory devices further includes a host device, a second memory device, and a third memory device, and the host device is coupled downstream of the second memory device and upstream of the third memory device on the power control path 404. The host device monitors the system power level PS and a plurality of device power levels of the plurality of memory devices 302.

In some embodiments, in accordance with a determination that a power shortage condition is satisfied, the electronic system increases a predefined power budget PB to a renewed power budget. The system power level PS is configured to vary below the predefined power budget PB that is increased to the renewed power budget. Further, in some embodiments, the memory system obtains the renewed power budget from a host module coupled to one of the plurality of memory devices 302. In some embodiments, the memory system automatically increases the predefined power budget PB by a predefined budget increase to generate the renewed power budget. Additionally, in some embodiments, the power shortage condition includes at least one of: the system power level PS having stayed on a predefined power budget PB for a threshold duration of time, at least a predefined portion of the plurality of memory devices 302 failing to increase respective power levels during a cycle of passing the power data packet 402, and the first memory device 302A failing to increase the first power level P1 for a first number of cycles.

In some embodiments, an electronic system includes a set of memory devices. The electronic system selects a subset of the set of memory devices of the electronic system as the plurality of memory devices 302, and arranges the plurality of memory devices 302 to the ring 440 of memory devices by at least assigning the upstream memory device and the downstream memory device to the first memory device 302A.

In some embodiments, each of the plurality of memory devices 302 operates in a power range having an upper power limit, and the plurality of memory devices 302 have a predefined power budget PB that is less than a predefined portion of a sum of upper power limits of all of the plurality of memory devices 302. Further, in some embodiments, prior to passing the power data packet 402 along the power control path 404, a start memory device 302S (FIG. 4A) sets the system power level PS at the predefined power budget PB and sets a plurality of device power levels of the plurality of memory devices 302 to be equal to one another. A sum of the plurality of device power levels is equal to the predefined power budget PB.

Memory is also used to store instructions and data associated with the method 600, and includes high-speed random-access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 600.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for dynamic power management, comprising:
    at a plurality of memory devices coupled into a ring of memory devices:
        passing a power data packet along a power control path that tracks the ring of memory devices continuously, including at a first memory device and during a current cycle:
            receiving the power data packet from an upstream memory device on the power control path, wherein the power data packet includes at least a system power level indicating total power consumption of the plurality of memory devices;
            setting a current power level of the first memory device based on the received power data packet;
            updating the power data packet based on the current power level; and
            sending the updated power data packet to a downstream memory device on the power control path.

2. The method of claim 1, wherein the power data packet further includes one or more of:
- a predefined power budget defining an upper limit of a total power of the plurality of memory devices;
- a first power level of the first memory device during a most recent cycle that precedes the current cycle; and
- a target power level of the first memory device during the current cycle.

3. The method of claim 1, further comprising:
- determining a first power level of the first memory device set during a prior cycle that precedes the current cycle;
- identifying a target power level associated with the current cycle of the first memory device; and
- comparing the first power level and the target power level of the first memory device.

4. The method of claim 3, wherein:
- in accordance with a determination that the first power level is greater than the target power level, the current power level of the first memory device is set to the target power level;
- passing the power data packet further includes replacing the first power level of the first memory device with the current power level; and
- updating the power data packet further includes decreasing the system power level of the power data packet by a power variation between the first power level and the target power level of the first memory device.

5. The method of claim 3, wherein in accordance with a determination that the first power level is less than the target power level, the current power level of the first memory device is set based on the system power level and a predefined power budget.

6. The method of claim 1, setting the current power level of the first memory device further comprises:
- determining a first power level of the first memory device during a most recent cycle that precedes the current cycle;
- identifying a target power level associated with the current cycle of the first memory device; and
- determining whether a first difference between the first power level and the target power level of the first memory device is greater than a second difference between the system power level and a predefined power budget.

7. The method of claim 6, wherein in accordance with a determination that the first difference is less than the second difference, the current power level of the first memory device is set to the target power level.

8. The method of claim 7, further comprising:
- replacing the first power level of the power data packet with the current power level, wherein updating the power data packet further includes increasing the system power level of the power data packet by a power variation between the first power level and the target power level of the first memory device.

9. The method of claim 6, wherein in accordance with a determination that the first difference is greater than the second difference, the current power level of the first memory device is set on the first power level, and updating the power data packet further includes keeping the system power level of the power data packet.

10. The method of claim 6, wherein in accordance with a determination that the first difference is greater than the second difference, the current power level of the first memory device is set to a sum of the first power level and the second difference.

11. The method of claim 10, further comprising:
- replacing the first power level of the first memory device with the current power level, wherein updating the power data packet includes increasing the system power level of the power data packet to the predefined power budget.

12. An electronic system, comprising:
- one or more processors; and
- memory storing one or more programs for execution by the one or more processors, the one or more programs further comprising instructions for:
  - at a plurality of memory devices coupled into a ring of memory devices, passing a power data packet along a power control path that tracks the ring of memory devices continuously, including at a first memory device and during a current cycle:
    - receiving the power data packet from an upstream memory device on the power control path, wherein the power data packet includes at least a system power level indicating total power consumption of the plurality of memory devices;
    - setting a current power level of the first memory device based on the received power data packet;
    - updating the power data packet based on the current power level; and
    - sending the updated power data packet to a downstream memory device on the power control path.

13. The electronic system of claim 12, wherein the ring of memory devices further includes a host device, a second memory device, and a third memory device, and the host device is coupled downstream of the second memory device and upstream of the third memory device on the power control path, the one or more programs further comprising instructions for:
- at the host device, monitoring the system power level and a plurality of device power levels of the plurality of memory devices.

14. The electronic system of claim 12, the one or more programs further comprising instructions for:
- in accordance with a determination that a power shortage condition is satisfied, increasing a predefined power budget to a renewed power budget, wherein the system power level is configured to vary below the predefined power budget that is increased to the renewed power budget.

15. The electronic system of claim 14, the one or more programs further comprising instructions for one of a group consisting of:
- obtaining the renewed power budget from a host module coupled to one of the plurality of memory devices; and
- automatically increasing the predefined power budget by a predefined budget increase to generate the renewed power budget.

16. The electronic system of claim 14, wherein the power shortage condition includes at least one of:
- the system power level has stayed on a predefined power budget for a threshold duration of time;
- at least a predefined portion of the plurality of memory devices fails to increase respective power levels during a cycle of passing the power data packet; and
- the first memory device fails to increase a first power level for a first number of cycles.

17. A memory system, comprising:
- a plurality of memory devices coupled into a ring of memory devices; and
- memory storing one or more programs for execution by one or more processors, the one or more programs further comprising instructions for:

passing a power data packet along a power control path that tracks the ring of memory devices continuously, including at a first memory device and during a current cycle:
- receiving the power data packet from an upstream memory device on the power control path, wherein the power data packet includes at least a system power level indicating total power consumption of the plurality of memory devices;
- setting a current power level of the first memory device based on the received power data packet;
- updating the power data packet based on the current power level; and
- sending the updated power data packet to a downstream memory device on the power control path.

18. The memory system of claim 17, wherein an electronic system includes a set of memory devices, the one or more programs further comprising instructions for:
- selecting a subset of the set of memory devices of the electronic system as the plurality of memory devices; and
- arranging the plurality of memory devices to the ring of memory devices, including assigning the upstream memory device and the downstream memory device to the first memory device.

19. The memory system of claim 17, wherein each of the plurality of memory devices operates in a power range having an upper power limit, and the plurality of memory devices has a predefined power budget that is less than a predefined portion of a sum of upper power limits of all of the plurality of memory devices.

20. The memory system of claim 17, the one or more programs further comprising instructions for:
- prior to passing the power data packet along the power control path, at a start memory device: setting the system power level at a predefined power budget, and setting a plurality of device power levels of the plurality of memory devices to be equal to one another, a sum of the plurality of device power levels equal to the predefined power budget.

* * * * *